(12) United States Patent
Barber et al.

(10) Patent No.: US 8,762,718 B2
(45) Date of Patent: Jun. 24, 2014

(54) BROADCAST DEDUPLICATION FOR SATELLITE BROADBAND

(75) Inventors: Simon E. M. Barber, San Francisco, CA (US); Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/566,950

(22) Filed: Aug. 3, 2012

(65) Prior Publication Data

US 2014/0040616 A1 Feb. 6, 2014

(51) Int. Cl.
*H04L 29/06* (2006.01)
*G06F 11/14* (2006.01)
*G06F 21/60* (2013.01)

(52) U.S. Cl.
CPC .......... *G06F 11/1453* (2013.01); *G06F 21/606* (2013.01); *H04L 63/0428* (2013.01); *H04L 63/062* (2013.01)
USPC ............................... 713/168; 713/150; 380/44

(58) Field of Classification Search
CPC .............. G06F 11/1453; G06F 21/606; H04L 63/0428; H04L 63/062
USPC ..................................... 713/168, 150; 380/44
See application file for complete search history.

(56) References Cited

U.S. PATENT DOCUMENTS

| | | | |
|---|---|---|---|
| 5,990,810 A | 11/1999 | Williams | |
| 6,658,463 B1 | 12/2003 | Dillon et al. | |
| 7,120,666 B2 | 10/2006 | McCanne et al. | |
| 7,814,149 B1 * | 10/2010 | Stringham | 709/203 |
| 8,050,251 B2 | 11/2011 | Ongole et al. | |
| 8,352,692 B1 * | 1/2013 | Jordan | 711/162 |
| 8,396,841 B1 * | 3/2013 | Janakiraman | 707/692 |
| 8,458,494 B1 * | 6/2013 | Bogorad | 713/193 |
| 8,479,304 B1 * | 7/2013 | Clifford | 726/29 |
| 2009/0037964 A1 * | 2/2009 | Murray et al. | 725/92 |
| 2011/0040728 A1 * | 2/2011 | Akirav et al. | 707/634 |
| 2012/0189015 A1 * | 7/2012 | Feder et al. | 370/400 |
| 2012/0204024 A1 * | 8/2012 | Augenstein et al. | 713/150 |
| 2012/0311327 A1 * | 12/2012 | Liu et al. | 713/167 |

* cited by examiner

*Primary Examiner* — Michael Pyzocha
(74) *Attorney, Agent, or Firm* — Shun Yao; Park, Vaughan, Fleming & Dowler LLP

(57) ABSTRACT

A headend gateway can receive a data stream to forward to a client device of a broadcast network, and can determine whether the data stream includes a data block that has been recently broadcasted to any device of the broadcast network. The system can generate a new data stream that includes an identifier to any data block that has been broadcasted recently, and includes an encrypted block-decryption key that allows the recipient of the data stream to decrypt the data block. A client device of the broadcast network can receive a plurality of encrypted data blocks from the broadcast network, and can cache a subset of these encrypted data block regardless of whether or not they are intended for the local client device. The client device can access a cached data block when it receives an identifier and a block-decryption key for the data block.

22 Claims, 10 Drawing Sheets

US 8,762,718 B2

BROADCAST DEDUPLICATION FOR SATELLITE BROADBAND

BACKGROUND

1. Field

This disclosure is generally related to data deduplication. More specifically, this disclosure is related to performing data deduplication on data streams over a satellite broadband connection.

2. Related Art

Satellite broadband is widely used in rural areas that are not equipped with other types of broadband Internet connections, such as cable or phone-based Internet service providers (ISPs). A broadband satellite can include 70 transponders (beams), and can support a 120 gigabit per second (Gbit/sec) capacity per transponder. To maximize the number of subscribers that can be assigned to each transponder, a satellite ISP can limit a customer's broadband connection, for example, to approximately 8 megabits per second (Mbit/sec). Given that not all users will be using the broadband connection at once, the satellite ISP can also oversubscribe each transponder by a factor of 66 to support approximately one million broadband customers per satellite.

However, the cost of manufacturing, launching, and operating a satellite makes satellite broadband an expensive alternative to the earth-bound alternatives. To decrease the service price per customer, the satellite broadband ISP would have to add additional customers per satellite transponder, which can degrade the quality of each customer's broadband connection.

Another issue with satellite broadband is data security. Any computing device coupled to a broadband satellite dish in a transponder's target area can listen to data streams beamed from that transponder. The broadband ISP's headend system safeguards each customer's data by encrypting the customer's broadband traffic so that it can be accessed only by the target customer. This creates a secure connection between the broadband headend and a respective customer, and prevents others from snooping in on the customer's data. However, if multiple customers of the same satellite transponder request the same content, the headend system has to perform redundant work by encrypting a separate data stream for each of these customers, and broadcasting each of these encrypted data streams separately via the satellite transponder.

Further, the satellite's distance to the Earth's surface causes a large round-trip delay between the client device and the satellite headend (e.g., approximately 580 milliseconds). This can make browsing Internet web pages feel slow because hypertext transfer protocol (HTTP) and transmission control protocol (TCP) which it is based on, require many round trips between the web browser and the web server to fetch a complete web page (e.g., images, web objects, etc.). A customer's computing device can reduce these delay effects by caching content that has been previously accessed by the local user. However, caching data for a single Internet connection does not improve the performance for content that the local user accesses for the first time, and does not reduce the user's overall bandwidth when the user downloads infrequently accessed large objects (e.g., a movie or a music stream).

SUMMARY

One embodiment provides a system that implements a headend gateway for a satellite broadband network. The headend gateway transmits content via a satellite to a plurality of client devices that continuously record all or part of the satellite transmissions, regardless of the intended recipient for each transmitted data stream.

During operation, the system can receive a data stream to forward to a first client device of a plurality of client devices. If the system determines that the data stream includes a data block that is likely to be available at the first client device (e.g., a data block that has been recently transmitted as an encrypted data block for a second client device of the plurality of client devices, while the first client device was recording), the system can replace the data block within the data stream with an identifier to the encrypted data block at the first client device. The system can encrypt a block-decryption key for the encrypted data block using an encryption key that corresponds to the first client device, and generates a data stream for the first client device. The data stream can include a link to the encrypted data block. This link is composed of the identifier to the encrypted data block, and can also include the encrypted block-decryption key that allows the first client device to decrypt the encrypted data block. If the system determines that the first client may have multiple copies of the data block on it's storage, then the link may reference multiple identifiers and multiple decryption keys. The system then transmits the data stream for the first client device.

In some embodiments, while determining that the data block has been previously transmitted, the system determines a previous transmission for the data block, and computes a data-access identifier for the previous transmission of the data block. The data-access identifier can indicate a number of bytes that would have been recorded by a client device that records all prior transmissions since the headend gateway started operation. This identifier facilitates the client device locating the data block directly on its storage device without accessing an index table. The identifier may not include the full number of required binary bits for its complete representation, but may be modulo the bytes required for the largest anticipated client storage period. The system then determines whether the data-access identifier is associated with an address later than an earliest identifier address currently stored at the first client device. If so, the system determines that the data block is stored at the first client device. Otherwise, the system determines that the data block is no longer stored at the first client device.

In some embodiments, the system determines an identifier for a received data block implicitly or explicitly from the data stream. The system can determine an implicit identifier for the received data block based on a position of the data block in the data stream received from the headend gateway (e.g., a block count, a byte count, or a time duration for the data block), or a storage location for the data block. Alternatively, the system can determine an explicit data-access identifier for the received data block by detecting the identifier in the data stream transmitted by the headend gateway. For example, the headend gateway can transmit the data-access identifier along with each data block, which each client device can use to store the data block. The headend gateway may not encrypt the data-access identifiers as it encrypts the data blocks, which allows client devices to identify data blocks even before they have access to the necessary decryption keys. If the headend gateway does encrypt a data-access identifier, the headend gateway can encrypt the identifier under a separate key that is available to all client devices that need to reference the corresponding data block.

In some embodiments, in response to determining that the data block is not likely to be available at the first client, the system can generate a block-encrypting key for the data block derived from a base key for the first client device and the data block's identifier. The system also generates the encrypted data block using the block-encryption key, and generates the data stream so that the data stream includes the encrypted data block.

In some embodiments, in response to determining that the data block is not likely available at the first client, the system can generate a random block-encrypting key for the data block. The system also generates the encrypted data block using the block-encryption key, and transmits the encrypted data block. The system then generates the data stream so that the data stream includes a link to the encrypted data block.

In some embodiments, the system determines a data category for the data block, such that the data category facilitates a client device in determining whether it needs to record the encrypted data block. The data category can be transmitted unencrypted or encrypted under a group key that all client devices can use to decrypt the data category. The system can transmit data category alongside the encrypted data block in the data stream.

In some embodiments, the system receives, from the first client device, a negative-acknowledgement response which indicates that the first client device does not have the encrypted data block in it's storage. Then, in response to receiving the negative-acknowledgement response, the system transmits the data block again, as if for the first time.

In some embodiments, the system uses existing solutions from transmission control protocol performance-enhancing proxies (TCP PEPs) to ensure the data stream (which includes encrypted blocks and links) is delivered quickly and reliably.

One embodiment provides a system that implements a client device within a satellite broadband network. During operation, the system can receive a plurality of encrypted data blocks from a data transmission of the broadband network. A respective encrypted data block is intended for one of a plurality of client devices of the broadcast network, and can be encrypted using a random key, or using a key derived from the base key for the corresponding client device and the data block's identifier. The system can store, from the plurality of encrypted data blocks, at least one encrypted data block that is intended for a remote client device.

The system can also receive a data stream that is directed to the local client device. The data stream can include a link. A link includes a plurality of identifiers (at least one) for encrypted data blocks that the local client device is likely to have cached, and includes corresponding block-decryption keys that facilitates the local client device in decrypting these encrypted data blocks. The system can decrypt an encrypted data block using the block-decryption key to obtain the data block.

In some embodiments, the stream can also include encrypted data blocks that the local device may not have previously stored. These encrypted data blocks may be encrypted using a key derived from the client's base key and the block's identifier. The system stores these encrypted data blocks, which are intended for the local client device. The system generates a decryption key from the client's base key and the block's identifier, and then decrypts the encrypted data block using the decryption key. At a later date, the system can receive a data stream that is intended for the local client device, which can include links (e.g., identifiers to one or more of these encrypted data blocks) without including the corresponding encrypted data blocks.

The block encryption key is derived from the client device's base key and the block's identifier using a one-way function. Other inputs to the one-way function may be used as well to enhance security.

In some embodiments, the stream can also include encrypted data blocks that the local device may not have previously stored. These encrypted data blocks may be encrypted using a random key. The system stores these encrypted data blocks. A later portion of the data stream can include a link, which includes the identifier of the encrypted data block and the key to use to decrypt it. On receiving the link, the system can decrypt the previously stored encrypted data block and access the data.

In some embodiments, while storing the encrypted data block for the remote client device, the system determines a data category for the encrypted data block. The system then compares the determined data category to one or more target categories for the local client device. Then, in response to determining that the data category matches a target category for the local client device, the system stores the encrypted data block.

In some embodiments, the system uses an identifier to locate a corresponding encrypted data block that has been stored locally. The identifier can indicate a number of bytes that have would have been recorded on the storage of the system if the system was recording all the data blocks it has received. If the system does not assign categories to data blocks, the identifier maps directly to a disk location for the desired data block (modulo the storage size, given that the client device records over content in a continuous loop). If the system assigns categories to data blocks, and uses categories to selectively record a portion of the broadcast data, the system finds the disk location for the desired data block based on an in-memory index that takes the identifier as input.

In some embodiments, when the system generates a data block to send to a server, the system can determine whether the data block matches a stored data block that has been received recently from the server. If so, the system determines an identifier for the stored data block, and generates a data stream that includes the identifier as a reference to the data block. The system then sends the data stream to the server, so that the data stream includes the reference identifier in place of the data block.

In some embodiments, the system maintains an in-memory index for stored data blocks that have been received via the broadcast network and decrypted. This in-memory index can be indexed by the hash of the contents of the data block as one of its indices. When the system generates a data block to send to a server, the system can use the in-memory index to determine whether the data block matches a previously received and decrypted data block. If the system finds a match, the system can also use the in-memory index to determine an identifier for the data block. The system then generates a data stream that includes the identifier as a reference to the data block, and sends the data stream to the server. The in-memory index can be periodically written to permanent storage and then restored from the permanent storage if the power to the system is temporarily interrupted.

BRIEF DESCRIPTION OF THE FIGURES

In the figures, like reference numerals refer to the same figure elements.

DETAILED DESCRIPTION

Figure 1:
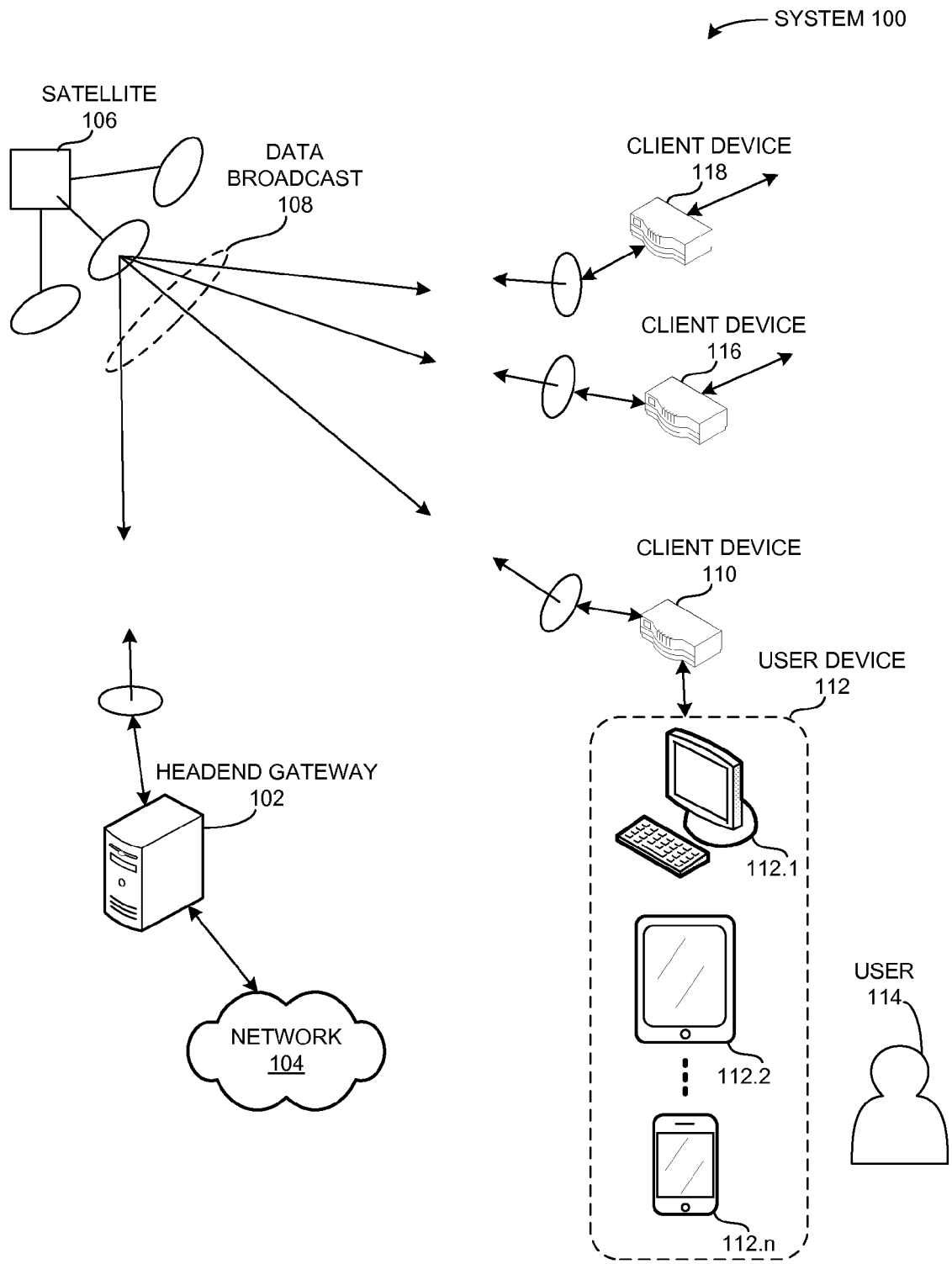
FIG. 1 illustrates a satellite broadcast system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a satellite broadband system that solves the problem of reducing the amount of data that needs to be communicated to a client device of a satellite broadcast channel by referencing data that was previously broadcasted over the broadcast channel for other client devices. For example, a headend gateway can partition a data stream into a plurality of data blocks before forwarding the data stream via the satellite broadcast channel, and the client devices of the broadcast channel can cache these data blocks regardless of whether they are the intended recipients. Also, when the headend gateway generates a data stream for a certain client device, the headend gateway can deduplicate data blocks from the data stream by replacing data blocks that the target device has cached with an identifier to the cached data block, even if the cached data block was initially intended for another device.

Data deduplication (also referred to as "dedupe") allows the headend gateway to reduce the amount of data that is communicated to each client device, which has the benefit of significantly increasing the available satellite bandwidth. The data stream generated by the headend gateway includes unique data blocks that have been encrypted using a key that is specific to each data block. This allows other client devices to cache these data blocks without being able to access the cached information until they receive the corresponding keys from the headend gateway.

The headend gateway implements the data deduplication framework at a layer below the data communication protocols. This allows the headend gateway to perform data deduplication to reduce the bandwidth for not only HTTP traffic, but also for peer-to-peer traffic (e.g., BitTorent download and upload traffic), and traffic for other protocols (e.g., email or ftp data). This can be achieved by deduplicating all TCP traffic, using a TCP performance enhancing proxy (TCP PEP). Additionally, specific application layer proxies may use the same data deduplication framework (e.g., an HTTP performance enhancing proxy). Since the same deduplication framework is used, the system can obtain bandwidth-saving benefits even when the same data is transferred using different modes. For example, a user can download data using BitTorent, and the headend gateway can apply data deduplication when the user sends the data to another person via an email, and deduplication can apply again when a different user downloads the email using HTTP (e.g., via a web-based email service).

Thus, the headend gateway separates into individual data streams the digital content that can be separated. TCP stream contents can be separated out from their TCP packets, and any web objects sent as part of a web accelerator system can be separated out into individual numbered streams (e.g., numbered per client). Many other sources for these individual data streams are also possible, such as real-time streaming protocol (RTSP) video traffic sent over user datagram protocol (UDP), network file system (NFS) traffic sent over UDP, etc. The headend gateway can feed any of these data streams into the same data deduplication system. Traffic that the gateway system cannot separate into a data stream (e.g., traffic whose type is not within a predetermined set) is passed unmodified to the client device.

Once the headend gateway separates a data stream out of the traffic going to a client device, the headend gateway transmits meta information about the data stream (and changes of state for the data stream) to the client device. The client device uses this meta information to reconstruct the data stream back into its original form (e.g., TCP packets, web objects, etc). Next, the gateway transmits the actual stream contents to the client device as deduplicated blocks, including a client identifier with each block (the client identifier is unencrypted, or group key encrypted, which allows the target client device to identify which blocks are intended for the target device), a stream identifier (which can be encrypted for the specific client, which allows the client device to determine which stream this transmission is for), the block data or link information (e.g., block identifiers and any required decryption key information), and optionally extra stream-specific information required for reconstructing the original data source.

The security framework used by the headend gateway and the client devices to communicate encrypted data packets can also be applied to other information systems. For example, a distributed web cache system can include a broadcast web cache system that sends encrypted data (e.g., web objects) to distributed devices that can cache the encrypted data if a user of a distributed device is likely to access this data in the near future. In this case deduplication is not used, just the security framework. FIG. 1 illustrates a satellite broadcast system 100 in accordance with an embodiment. Satellite broadcast system 100 can include a headend gateway 102 (e.g., a satellite network headend) that communicates network data between a network 104 (e.g., the Internet) and a satellite 106. Satellite 106 can include a plurality of transponders (e.g., 70 transponders) that each receives and/or transmits a beam that streams data to/from a particular region of the earth's surface. A transponder can be assigned to approximately ten thousand broadband typical customers that do not perform data deduplication using data blocks from other customers. The headend gateway 102 can significantly increase the number of customers that can be assigned to each transponder by reducing the amount of data that is transmitted to and/or received from each customer.

During operation, headend gateway 102 can receive data traffic for a user device 112, such as a personal computer 112.1, a tablet 112.2, a mobile device 112.*n*, and/or any other computing device of a user 114 that is connected to the Internet via satellite 106. Headend gateway 102 can generate a data stream for user device 112 that is safe to broadcast through a transponder of satellite 106 (e.g., via data broadcast 108). This data stream includes a plurality of encrypted data blocks that can be cached by a client device 110 of user 114 (e.g., a data modem or local router), or by any other client device listening to the same transponder (e.g., client devices 116 or 118).

Client device 110 includes or is coupled to a local storage device (e.g., a 2 terabyte hard drive), and can use this storage device to selectively cache data blocks received via data broadcast 108, regardless of which client device is the intended recipient of a data block. For example, a 2 terabyte storage device can cache a complete output stream of a 400 megabit per second transponder for approximately 11 hours. In some embodiments, client device 110 can be assigned one or more data categories, and data blocks are transmitted with a category marker that can be decoded by a group of clients. Client device 110 can then selectively cache only data blocks that have a matching category, which allows it to record data blocks for a significantly longer period of time.

Headend gateway 102 can deduplicate data from a data stream that is to be routed to client device 110 by replacing data blocks cached by client device 110 with a corresponding identifier to this cached data block. Further, client device 110 can deduplicate data that is to be transmitted to headend gateway 102 by replacing cached data blocks with the corresponding identifier.

Ideally, a client device will record an entire data stream broadcasted via one transponder on a satellite, or selective portions of the data stream. However, the amount of content that the client device records is limited by the maximum recording speed of the client's storage device. For example, a typical hard disk drive can record a maximum of 60 megabytes per second (MB/sec) when recording at the innermost cylinders, which translates to a maximum of 480 megabits per second (Mb/sec). If a transponder broadcasts data at a higher data rate than 480 Mb/sec, the client devices may need to be partitioned into groups to reduce the maximum data rate the client devices need to record to keep up with their data stream. In some embodiments, the headend gateway may partition a group of users by interests, to maximize the overlap in the content they consume.

The maximum data rate that can be recoded by the client device is limited by the maximum recording speed for its storage device, as well as the maximum speed that the device can read data. In some embodiments, the maximum data rate that the client device is expected to record is determined so that the client device's storage device has sufficient time available to also perform data deduplication (e.g., sufficient time to seek and read back the identified data bocks). For example, the headend gateway may compute a client device's maximum bandwidth by estimating that approximately 80% to 90% of its storage device's maximum disc bandwidth can be used to record a data stream. The headend gateway may take this maximum recording bandwidth into account when organizing client devices into compatible groups.

In some embodiments, the implementation of the client device is optimized to make efficient use of the storage device. Thus, storing indexes on disc to search for cached content does not provide an effective solution, given that the index table would burden the storage device with unnecessary random access. This random access causes the storage device to spend time repositioning the read heads for each lookup operation on the index table. The client device can minimize the burden on the storage device by storing any index tables used during deduplication in RAM. For example, if users elect to store data from only a select group of categories, each client device will likely store a non-contiguous collection of data. This non-contiguous storage of data breaks the one-to-one mapping from broadcast byte counts to disc locations, which prevents the system from determining the location of a cached block based on a block identifier that indicates a broadcast byte count. Further, because the system uses most of the disc bandwidth to record and access data, the system does not have much disc bandwidth available to read from or write to an index table on-disc.

In some embodiments, the client device can use an index table, stored in RAM, to map a byte count for a data block into a disk location. For example, if the client device includes a 1-terabyte (TB) disc drive, then the client device can use a 40-bit address to cover every possible byte on the disc (e.g., 40 bits to address the maximum range of broadcast data that can be recorded). Further, because the client device may typically access the disc in 4-kilobyte (KB) sectors, the client device can use an in-RAM index table to map a byte-count range for a 4 KB data stream to a 4 KB disc sector. Each 4 KB disc sector occupies a 12-bit address range (e.g., the least-significant bits of the 40-bit address), which leaves a 28-bit address that can be used to locate a 4 KB disc sector. Thus, for a 1 TB cache of recorded broadcast data, the client device can use an index table with 256 M entries (268,435,456 entries). Each entry can store 30 bits: 28 bits to refer to a specific sector on the disc, and 2 additional bits to count a number of sectors to fetch (e.g., for a data block that spans more than one sector). The system can store the index table using 960 MB of RAM (256 M entries*30 bits per entry), which is within the range available in many consumer set-top boxes.

By storing and accessing this index in RAM, the client device can translate a byte count for a data block (from a data stream) into a disc sector (for a cached data block), without consuming disc bandwidth while performing a lookup operation. The index entries cover the broadcast data address space minus the least-significant 12 bits, and indicate which disc sector (or multiple sectors) the client device needs to read from the disc to retrieve all data blocks from that portion of the broadcast address space (which may be indicated by a byte count, or a byte range). When the client device writes data blocks to the disc, they are written contiguously using block-identifying information. For example, the client device can write each data block to disc using a magic marker prefix (e.g., by inserting predetermined bits that indicate the start and/or end boundaries of each data block, so that the block boundaries can be located), and can write the broadcast address in the block header (so that given a sector or a few sectors on the disc, the client device can find the exact block it is looking for based on the broadcast address or byte count).

In summary, this RAM-based index allows the system to store only content related to a user's assigned content categories, which reduces the amount of data that is recorded, extends the time period over which the disc caches data, and increases the hit rate for subsequent accesses. Further, because the client device stores the index in RAM, the client device can minimize the disruptions to the disc's bandwidth. The system can periodically copy the in-memory index to permanent storage. If the system goes offline (e.g., power to the system is temporarily interrupted), the system can restore the in-memory index from the permanent storage upon resuming operation.

In some embodiments, cryptographic protocols (e.g., SSL, HTTPS, etc.) are not deduplicated or supported by the headend gateway, given that the encrypted content appears as random data during deduplication. To allow the client devices efficient access to services provided over these protocols, the headend system and the client devices can be configured using the following three strategies. First, the client devices can be configured to implement the web proxy auto-discovery (wpad) protocol. Typical desktop browsers implement the wpad protocol to connect to a proxy and allow the proxy to implement SSL encryption for the connection. However, to allow a client device access to a service via SSL, the desktop browser can be configured to connect unencrypted to the client device, at which point the headend gateway implements SSL encryption for the client device. This configuration allows the client device to access services over a cryptographic protocol in such a way that the headend gateway can deduplicate the data over the satellite link.

Second, the headend gateway can be provisioned with private keys from a specific content provider's server certificates. This allows the headend gateway and the client device to perform a man-in-the-middle attack on the SSL stream, which gives the headend gateway access to the unencrypted data. Thirdly the user's client device can be provisioned with a new certificate authority (CA) certificate, which allows the headend and the client device to implement a man-in-the-middle attack and access the unencrypted data for the HTTPS connections.

Headend Gateway

Embodiments of the present invention provide a system that implements a headend gateway that performs data deduplication by analyzing a byte stream and segmenting it into data blocks. The system compares data blocks from data streams for various different client devices, and avoids transmitting duplicate data by replacing duplicate data blocks with identifiers to these data blocks.

A data block that is transmitted for the first time is encrypted using a block-encryption key that is specific to that data block, and the corresponding block-decryption key is revealed only to the client devices that are allowed to access the data block. For example, when another device needs to receive the same data block to satisfy a request from a user, the system can send the link to the data block to the device (e.g., an identifier to the data transmission that contained the original encrypted data block), as well as the specific block-decryption key for the data block. This ensures that the cached data blocks remain private until they are used or re-used by a client device.

In some embodiments, the headend gateway can significantly improve the cache hit rate at the target client device by predicting which data blocks a particular user will be very unlikely to use in the near future. These predictions allow the target client device to ignore and not cache data blocks that the local user is not likely to be interested in, which in turn allows the client device to cache data blocks that cover a longer period of time. For example, the headend gateway can determine a content category for each piece of data, and can label any data blocks for this data using the content category. The headend gateway also transmits the content category along with the data blocks in a deduplicated data stream, so that only client devices with a matching category will cache the data blocks. However, the headend gateway does not transmit a content category for data blocks that have been replaced by links in the deduplicated data stream.

Further, the headend gateway can track the cache state for various client devices of the broadcast channel to determine what content may be cached at each client device. For example, the headend gateway can receive an updated state from a client device when the client device is turned on or otherwise connected to the headend gateway. This updated state can indicate block identifier for the last data block that was cached by the client device before the client device was last turned off or lost a satellite signal. The headend gateway can also receive periodic state information that indicates any data blocks that the client device has not cached (e.g., due to a temporary signal interruption, or because the client device's user is not likely to need the data in the near future). This synchronized state information facilitates the headend gateway to determine when it can deduplicate a data block in a data stream for a client device, and to determine when it needs to send the data block to the client device in the data stream.

Figure 2:
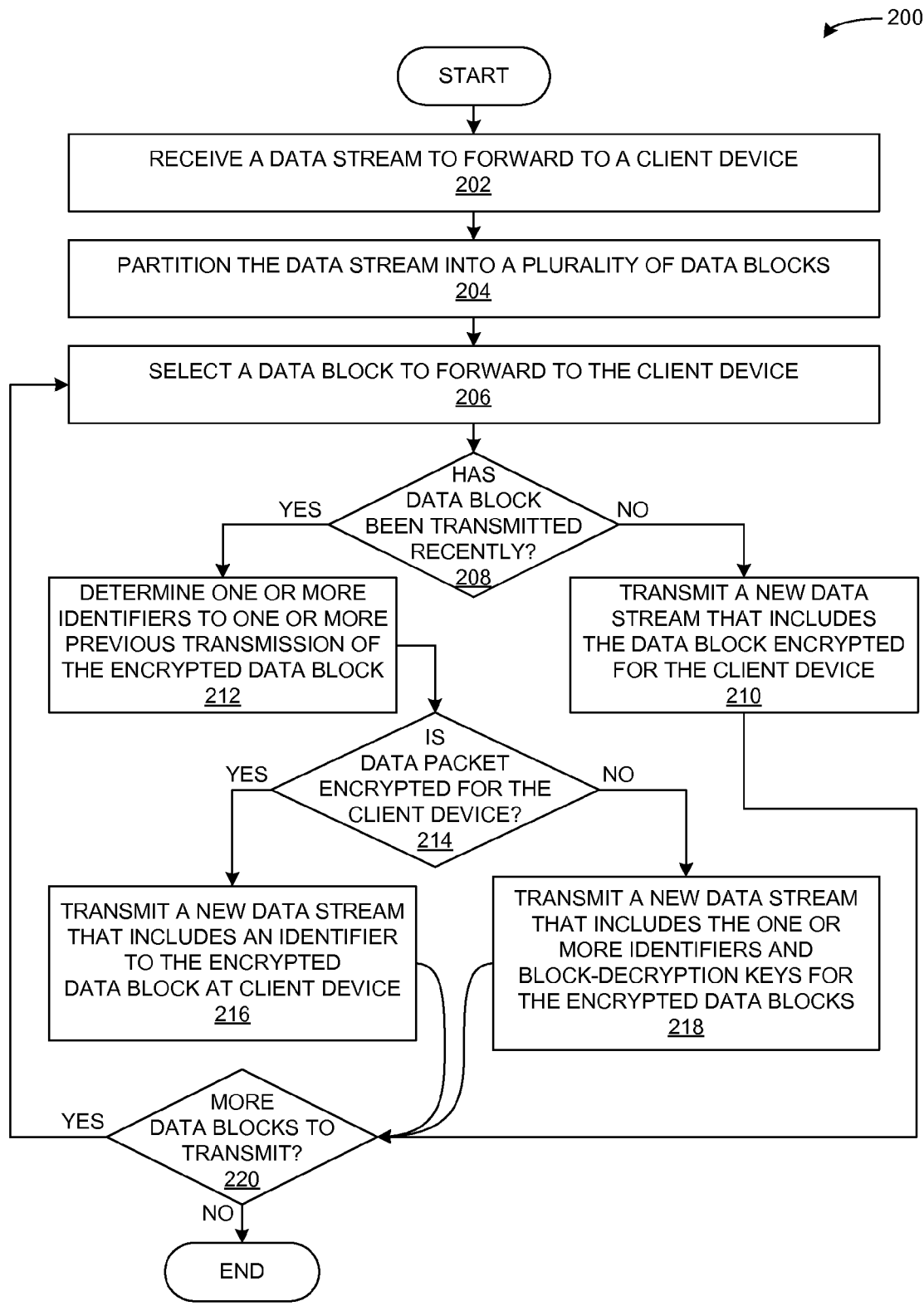
FIG. 2 presents a flow chart illustrating a method for partitioning a data stream into a plurality of data blocks in accordance with an embodiment.

FIG. 2 presents a flow chart illustrating a method 200 for partitioning a data stream into a plurality of data blocks in accordance with an embodiment. During operation, the system receives a data stream to forward to a client device (operation 202), and partitions the data stream into a plurality of data blocks (operation 204). For example, to detect each data block of the data stream, the system can process the data stream using a rolling hash until it identifies a block boundary. Using the rolling hash allows the system to identify a block boundary based on the contents of a data stream, and not based on the source of the data stream.

The rolling hash can include a sequence of bytes that span over a segment of the data stream (e.g., the last 50 bytes of the data stream). As the system receives each byte of the data stream, the system can drop an oldest byte from the rolling hash, and can add the new byte from the data stream to the rolling hash. To determine whether it has reached a block boundary, the system can use a boundary-detecting hash function that takes the rolling hash as input to compute a hash value. Then, if a data block is to include approximately n bytes of data, the system can determine whether it has reached a block boundary by computing the Boolean expression:

$$\text{hash\_value mod } n == 0 \quad (1)$$

If equation (1) evaluates to true, the system determines that it has reached a block boundary, such that the last byte of the rolling hash corresponds to the last byte of a data block. The system then generates a data block from the data stream to include a sequence of bytes between a previous block boundary (or the start of the data stream) and the identified block boundary.

After partitioning the data stream (or a portion of the data stream), the system selects a data block to forward to the client device (operation 206). The system determines whether the selected data block has been recently transmitted and is likely to be stored at the target client device (operation 208). For example, during operation 208, the system can use an identifier for a previous transmission of a data block to determine whether this identifier is later than the earliest identifier currently stored at the target client device (or determine if the identifier is within a list of unavailable identifier address ranges recorded from downtime status updates from the target client device).

If the data block is not likely to be stored at the target client device, the system can transmit a new data stream that includes the data block in encrypted form, and includes a data category for the data block (operation 210). The system can encrypt the data block by deriving a block-encryption key from the target device's base key and the block identity, and using this key to encrypt the data block. The data category is not encrypted.

However, if the data block is likely to be stored at the target client device, the system determines one or more identifiers to one or more previous transmissions of the encrypted data block (operation 212). The system can generate an identifier based on the number of bytes necessary to store all prior data blocks that have been transmitted. When a client device stores a data block into a local storage, the client device may also write a determinable number of additional bytes surrounding the data block to delimit the data blocks, and may skip some of the fields transmitted with the data block, for example the category. This means that the byte position of a block on storage may not correspond to the byte position of the block in the transmission stream. The client device can use the identifier as an offset value to compute a storage index for the encrypted data block. Thus, basing the identifier on the number of bytes that would have been required to record the previous data blocks simplifies the client device's task of determining where on disc to access the previous transmission of the data block. If the client device is not using categories to select data blocks to record, the identifier easily maps directly to the disc position where the block will be located.

Recall that a client device can store encrypted data blocks, regardless of whether it is the intended recipient, if the encrypted data block corresponds to a content category associated with the client device. Thus, the client device may or may not be able to generate a decryption key for a given encrypted data block. To determine what information needs to be sent to the client device so that it can access the encrypted data block, the system determines whether the encrypted data packet stored by the client device has been encrypted for the client device (operation 214). If so, the system transmits a new data stream that includes an identifier to the encrypted data block at the client device (operation 216). This data stream does not need to include the decryption key for the encrypted data block, because the client device can generate the decryption key using a one-way function that takes as input the client device's base decryption key and the identifier for the encrypted data block. The system can transmit the data stream so that it includes the data block addressed to a particular stream or client (e.g., by including a unique identifier for the stream, and optionally for the client), so the identifier is then implicit to the receiving client and does not need to be separately transmitted.

However, if the data packet is not encrypted for the client device, the system can transmit a new data stream that includes a link to the encrypted data block. The link is sent encrypted for the specific client device, and includes the identifier and an encrypted block-decryption key for the encrypted data block (operation 218). Given that the new data stream is broadcasted across a plurality of client devices, the system can encrypt the link using the base key assigned to the client device so that only the intended client device can obtain the block-decryption key from the new data stream.

Satellite transmission is not 100% reliable, which can cause the client device to miss a few data blocks that were previously transmitted for a different client device. Client devices can transmit a negative acknowledgement (NAK) signal to request retransmission of missing data blocks, which eventually causes data blocks from a popular stream to be transmitted multiple times.

In some embodiments, while transmitting a data stream for the target client device, the system transmits multiple identifiers to a plurality of previous transmissions of the data block. These multiple identifiers can correspond to an original transmission of a data stream, as well as re-transmissions of data blocks that respond to NAK signals, or any other transmission of data blocks with identical content. Transmitting multiple identifiers for a data block increases the likelihood that the client device will have received at least one of the previous transmissions of the data block. Sending multiple identifiers for a data block introduces a small data overhead. Thus, the system can determine whether to send multiple identifiers on a case-by-case basis in order to optimize the system throughput.

Once the system transmits the new data stream that includes or identifies the encrypted data block (e.g., operations 210, 216, or 218), the system can proceed to determine whether there are more data blocks to transmit (operation 220). If so, the system can return to operation 206 to select another data block.

Figure 3:
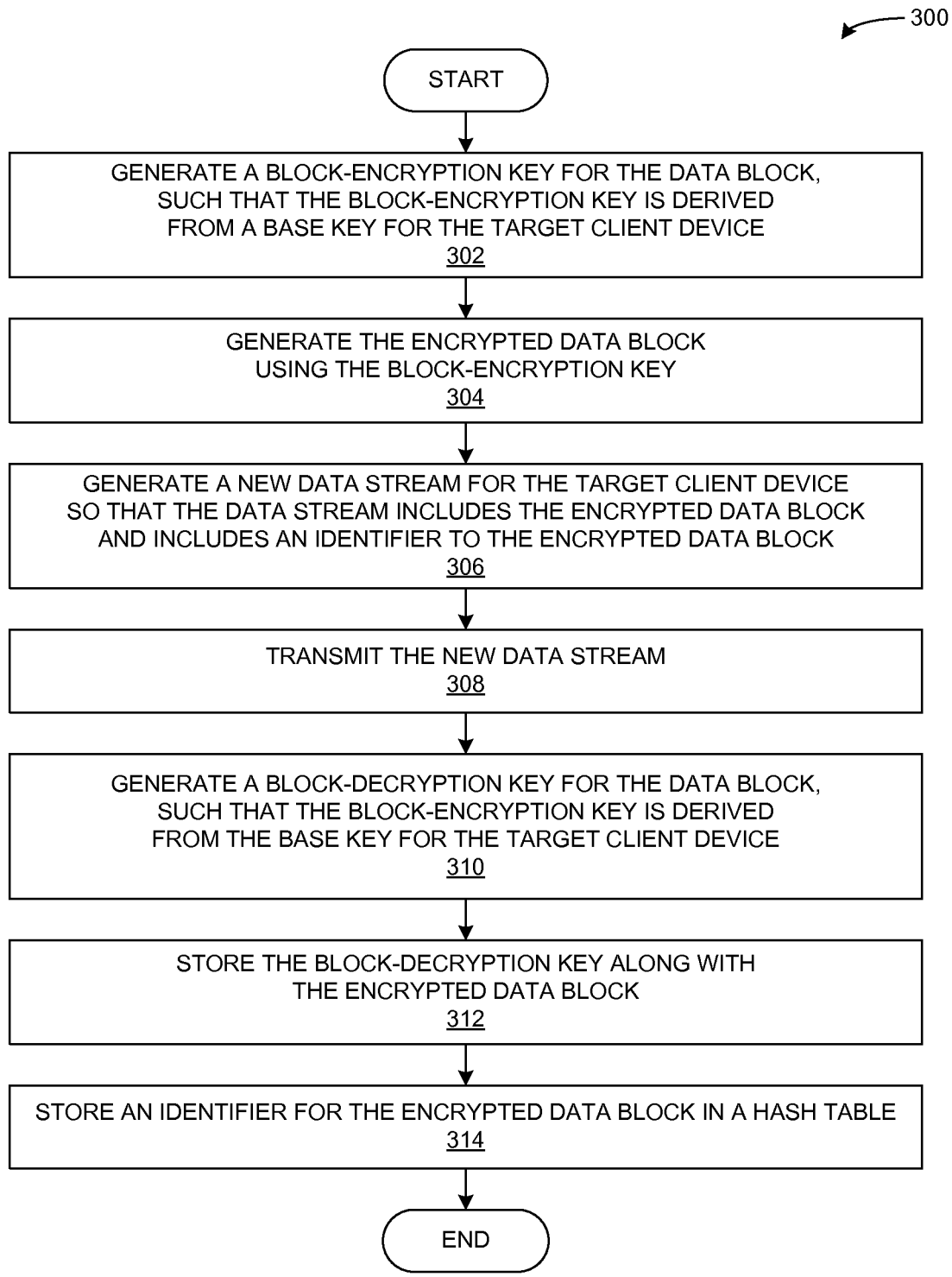
FIG. 3 presents a flow chart illustrating a method for generating and transmitting an encrypted data block for a target client device that does not have the data block cached in the local data repository in accordance with an embodiment.

FIG. 3 presents a flow chart illustrating a method 300 for generating and transmitting an encrypted data block for a target client device that does not have the data block cached in the local data repository in accordance with an embodiment. During operation, the system generates a block-encryption key for the data block (operation 302), and encrypts the data block using the block-encryption key to generate the encrypted data block (operation 304). For example, the system can generate the block-encryption key so that it is derived from the base key assigned to the target client device and an identifier for the data block (e.g., by using a one-way function that takes the base key and the identifier as input). The system then generates a new data stream that includes the encrypted data block and can include the identifier to the encrypted data block (operation 306), and transmits the new data stream over the broadcast channel (operation 308). In some embodiments, this new data stream serves as the initial transmission for the data block, which includes the data block and can also include the data block's identifier that other client devices can use to index the data block.

In some other embodiments, during operation 306, the system does not include the identifier or a decryption key for the data block in the data stream. For example, the client device can derive the data block's identifier based on a counter value that increments for every subsequent data block received, or data offset (e.g., an offset in MB). Further, the client device can derive the decryption key from the client device's base key, without receiving a separate key and identifier pair for the data block. Thus, the system can generate the data stream to include a combination of data blocks (when the client device has not cached the data block) and identifier/key pairs (for data blocks that the client device is likely to have cached).

The system can also generate a block-decryption key for the encrypted data block (operation 310), and stores the block-decryption key along with the encrypted data block (operation 312). The system can send the block-decryption key at a later time to a different client device that has a copy of the encrypted data block in a local cache. In some embodiments, the system can use symmetric cryptography during operations 304 and 310 to generate a key that's use as both the block-encryption key and the block-decryption key. In some other embodiments, the system can use public-key cryptography during operations 304 and 310 to generate a block-decryption key that is different from the block-encryption key.

The system can also store the identifier for the encrypted data block in a hash table (operation 314). The system can use this hash table at a later time when generating a data stream for any client device to efficiently determine whether the data block is likely to be stored by the target client device. For example, the system can use a hash function to process the data block (or a checksum for the data block) to obtain an index value for the hash table. If the hash table does not have an entry for the index value (e.g., an identifier has not been stored recently in this hash table entry), the system can determine that the data block is not likely to be stored at the target client device. Otherwise, the system can use the identifier from the indexed hash table entry to determine whether the intended client device may have stored the encrypted data block.

Figure 4:
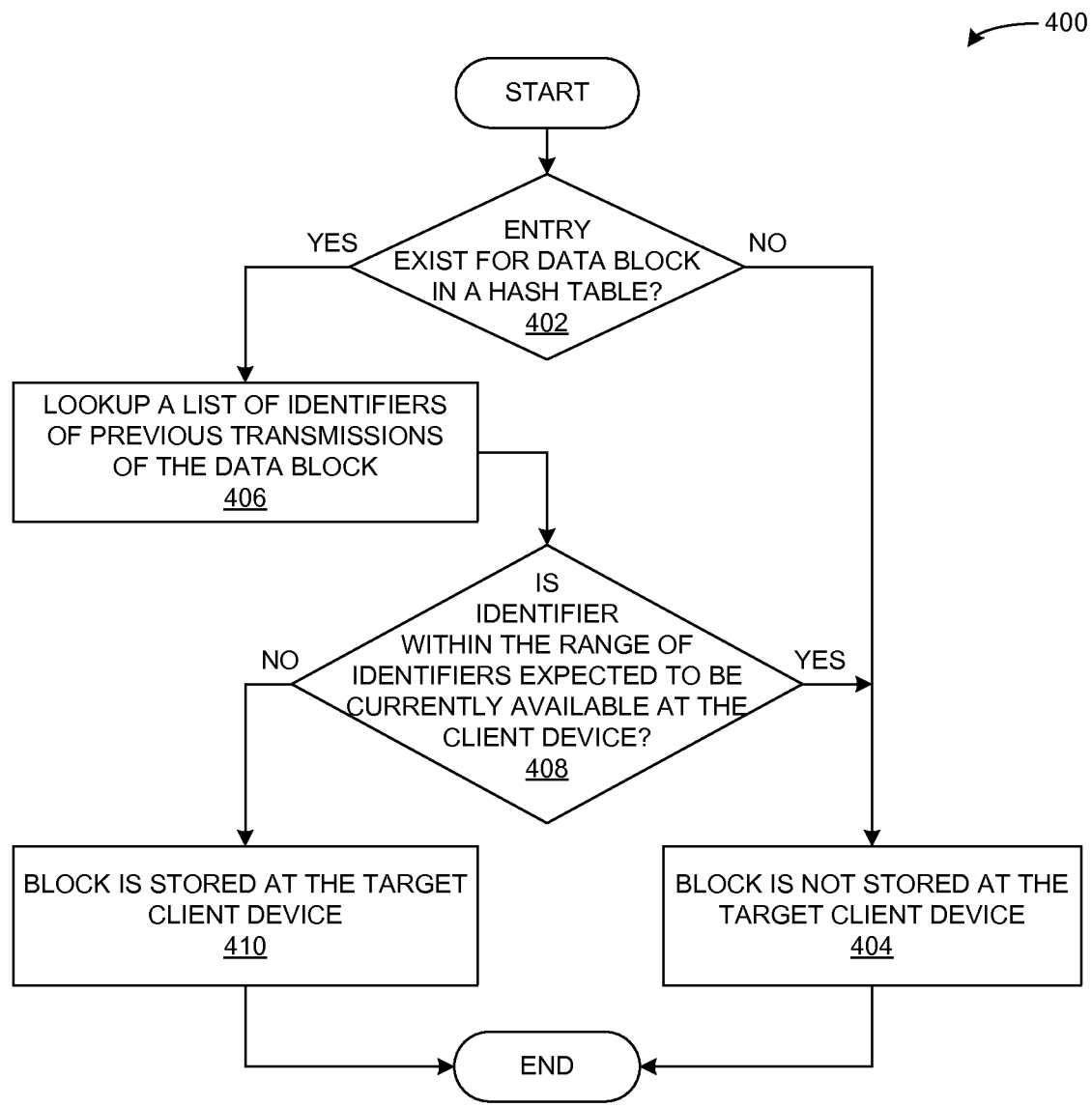
FIG. 4 presents a flow chart illustrating a method for determining whether a target client device has stored a copy of a data block in accordance with an embodiment.

FIG. 4 presents a flow chart illustrating a method 400 for determining whether a target client device has stored a copy of a data block in accordance with an embodiment. During operation, the system determines whether an entry exists for the data block in a data-block hash table (operation 402). For example, the system can process the data block using a data-block hashing function to compute a hash value for the data block, and can use this hash value to perform a lookup into the data-block hash table. If a corresponding entry does not exist, the data block has not been transmitted recently, and so the system determines that the block is not stored at the target client device (operation 404).

However, if the system determines that an entry does exist for the data block in the data-block hash table, the system looks up a list of identifiers for previous transmissions of the data block (operation 406). Recall that the target client device may not cache every encrypted data block that it receives. In some embodiments, the system can keep track of how much data the client is caching taking into account the categorization of blocks and reported down time from the client, and knowing the size of the client's cache can approximate what the oldest identifier stored in the client is.

The system can compare the identifiers to the ranges of identifiers known to be available on the target client device (operation 408). If none of the identifiers are within the ranges known to be available at the client device, the system can determine that the data block is not stored at the target client device (operation 404). Determining this can cause the system to generate a data stream that includes the encrypted data block for the client device.

Otherwise, if the system can determine that the data block is likely to be stored at the client device (operation 410). Determining this can cause the system to generate a data stream that includes an identifier to the encrypted data block for the client device, but the data stream may not include the encrypted data block itself. It is possible that the system may not always make a correct prediction. If the client device receives an identifier to a data block to which it does not have a local copy, the client device can respond by sending a negative acknowledgement (NAK) for the data block.

Satellite reception is not reliable, so it is expected that a small percentage of identifiers will reference data blocks that have not been successfully received by the client device, and NAKs will be sent for these. When the headend gateway identifies that a client device has multiple copies of a data block in its cache, the headend gateway may send multiple identifiers to the client device. Thus, if one copy of the data block is not available at the client device (perhaps due to bit errors during reception), then a copy for a different identifier may be available. If multiple copies of data block are available at a particular client, the headend gateway may choose an optimal number of identifiers to send to the client device (e.g., to optimize system throughput, and/or to minimize the likelihood for a cache miss), given the small overhead in sending each identifier.

In some embodiments, the headend gateway can track a range of identifiers for each client device. Each client device stores its identifiers in a circular buffer, and may have gaps in identifiers for data blocks transmitted by the headend gateway (e.g., gaps in the recorded content for periods when the client device is turned off and back on). Whenever the client device goes online again, the client device communicates a status update to the headend gateway indicating which content items were last recorded. The headend gateway uses this status update to update a list of identifier ranges that indicate the content that is likely to be cached at the client device. Further, as the client device stores new content, the client device writes over older content (e.g., using the circular buffer to determine which data blocks to delete). The headend gateway can also update the identifier ranges to account for older data blocks that have been deleted at the client device.

Figure 5:
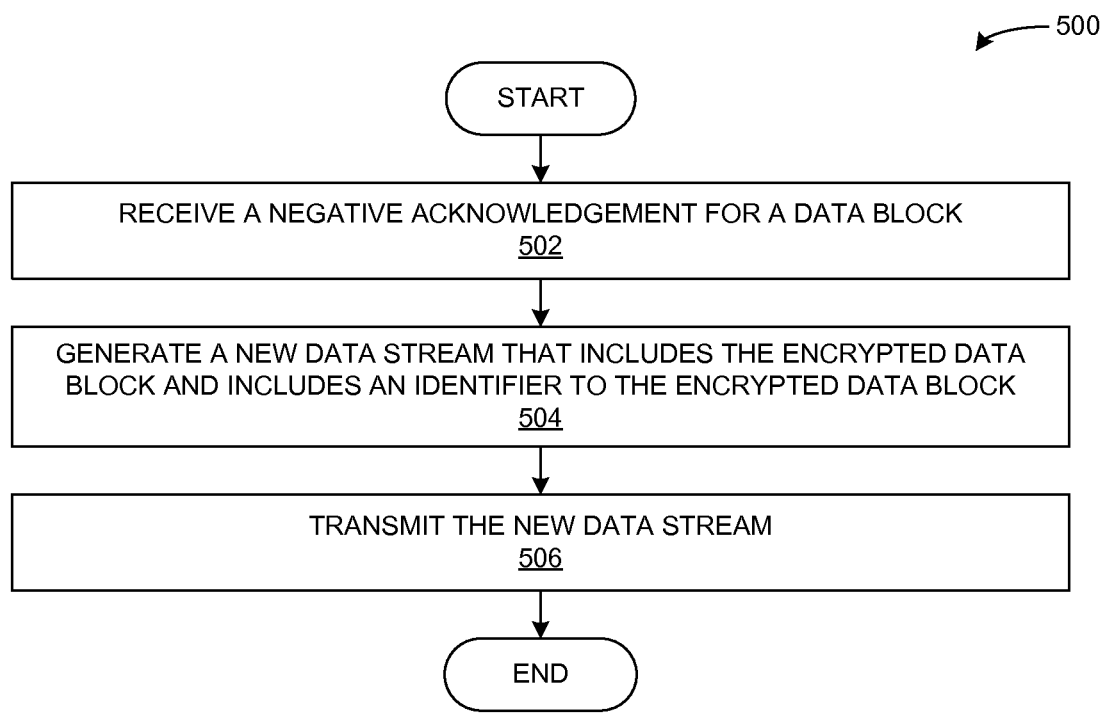
FIG. 5 presents a flow chart illustrating a method for processing a negative acknowledgement response from a target client device in accordance with an embodiment.

FIG. 5 presents a flow chart illustrating a method 500 for processing a negative acknowledgement response from a target client device in accordance with an embodiment. During operation, the system can receive a negative acknowledgement for a data block (operation 502). In response, the system generates a new data stream that includes the encrypted data block, and includes an identifier to the encrypted data block (operation 504). The system then transmits the new data stream over the broadcast channel (operation 506).

In some embodiments, if the encrypted data block has been generated using a base key for a different client device, the system can re-generate the encrypted data block using the target client device's base key. Then, during operation 504, the system can generate the new data stream to include this encrypted data block. The target client device can derive the corresponding block-decryption key from the target client device's base key. In some other embodiments, during operation 504, the system can generate the new data stream to include the encrypted data block that has been generated using the other client device's base key, and to also include an encrypted block-decryption key that has been encrypted for the target client device.

Client Device

Embodiments of the present invention provide a client device that caches data blocks from a broadcast channel (e.g., a satellite channel), even if the data block is intended for another device. Each of these data blocks is encrypted using a key that is specific to the data block, so that client devices can be given access to data blocks on a block-by-block basis. Non-target client devices can cache these data blocks without being able to access the cached information until they receive the corresponding keys from the headend gateway.

The headend gateway can generate the encryption key so that it is derived from a base key for the target client device. This allows the target client device to derive the block-decryption key on its own as it receives the data blocks. If another client device is allowed to access a cached data block during deduplication, the other client device can receive an identifier and the block-decryption key for the cached data block, without having to receive the data block itself.

Figure 6:
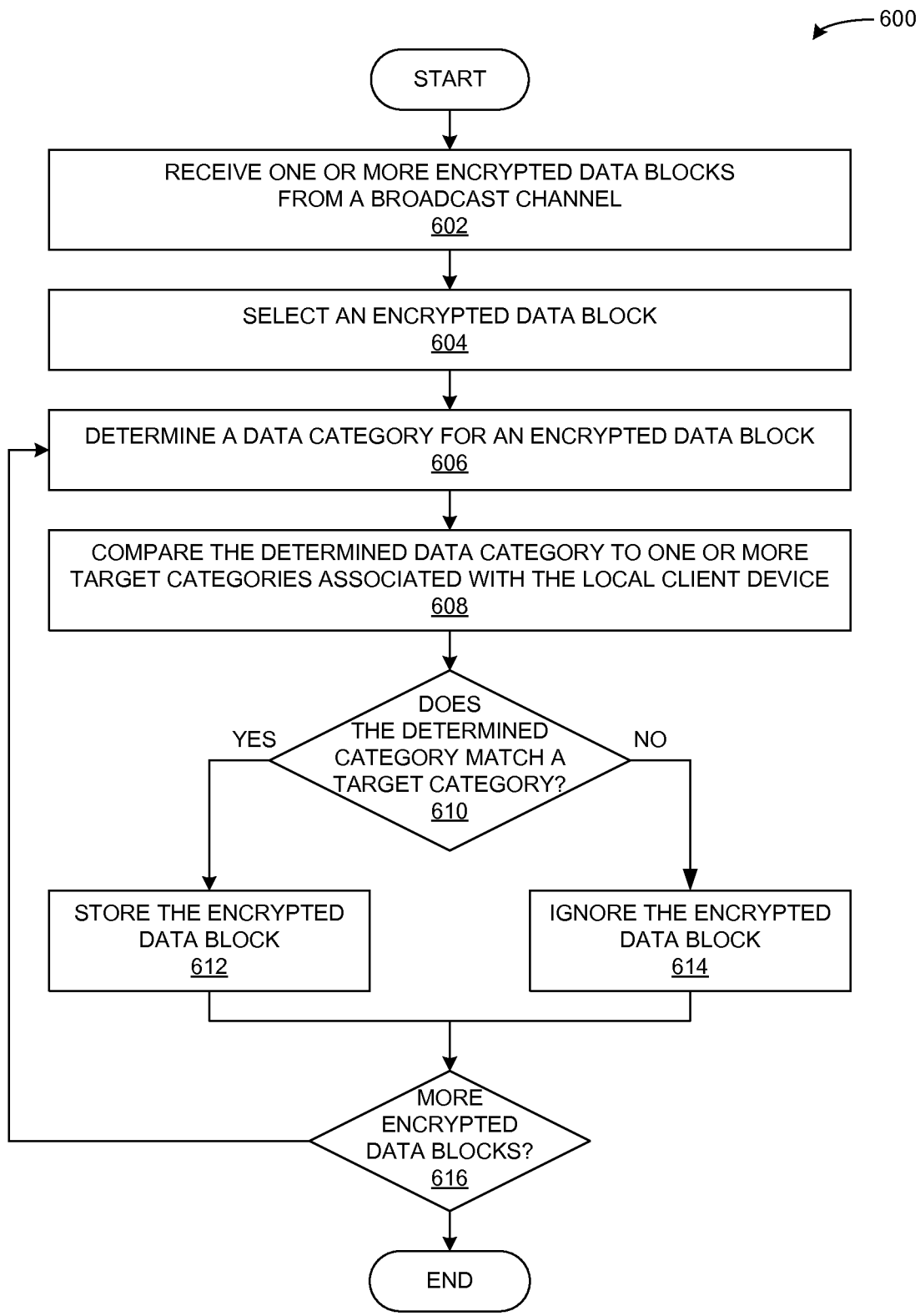
FIG. 6 presents a flow chart illustrating a method for selectively storing data blocks that are broadcasted over a satellite channel in accordance with an embodiment.

FIG. 6 presents a flow chart illustrating a method 600 for selectively storing data blocks that are transmitted over a satellite channel in accordance with an embodiment. During operation, the system receives one or more encrypted data blocks from a broadcast channel (operation 602). Some of these encrypted data blocks may be intended for the local client device, and others may be intended for other client devices. Also, the data stream can include additional information about the encrypted data blocks, such as an identifier to an encrypted data block, an identifier to an intended recipient (e.g., the local client device, or a different client device), an identifier to a specific data stream, and one or more categories that characterize the encrypted data block.

The system then selects an encrypted data block (operation 604), and determines a data category for the encrypted data block (operation 606). The data category can characterize, for example, the information carried by the encrypted data block, a source of the data (e.g., a website), a user group that typically requests the data (e.g., represented by a name or a numerical identifier), etc. The system compares the determined data category to one or more target categories associated with the local client device (operation 608), and determines whether there is a match (operation 610). If the determined category matches a target category of the local client device, the system stores the encrypted data block in a local cache based on an identifier for the data block (operation 612). Otherwise, the system can ignore the encrypted data block (operation 614), or the system can perform another remedial action.

The system then determines whether there are more encrypted data blocks to process (operation 616), and if so, returns to operation 604 to select another encrypted data block.

In some embodiments, the system determines an identifier for a received data block implicitly or explicitly from the data stream. The system can determine an implicit identifier for the received data block based on a position of the data block in the data stream received from the headend gateway. Alternatively, the system can determine an explicit data-access identifier for the received data block by detecting the identifier in the data stream transmitted by the headend gateway. For example, the headend gateway can transmit the data-access identifier along with each data block, which each client device can use to store the data block. The headend gateway may not encrypt the data-access identifiers as it encrypts the data blocks, which allows client devices to identify data blocks even before they have access to the necessary decryption keys. If the headend gateway does encrypt a data-access identifier, the headend gateway can encrypt the identifier under a separate key that is available to all client devices that need to reference the corresponding data block.

When the system receives a data stream from the headend gateway, the system needs to process the data stream to obtain and decrypt a set of encrypted data blocks that encode the contents of the data stream. Some of these encrypted data blocks may be included in the data stream, and other data blocks may be stored in the data-block cache and referenced by the data stream. Once the system has decrypted all of the data blocks there were embedded in or referenced by the data stream, the system can combine these data blocks to produce the contents of the data stream.

Figure 7:
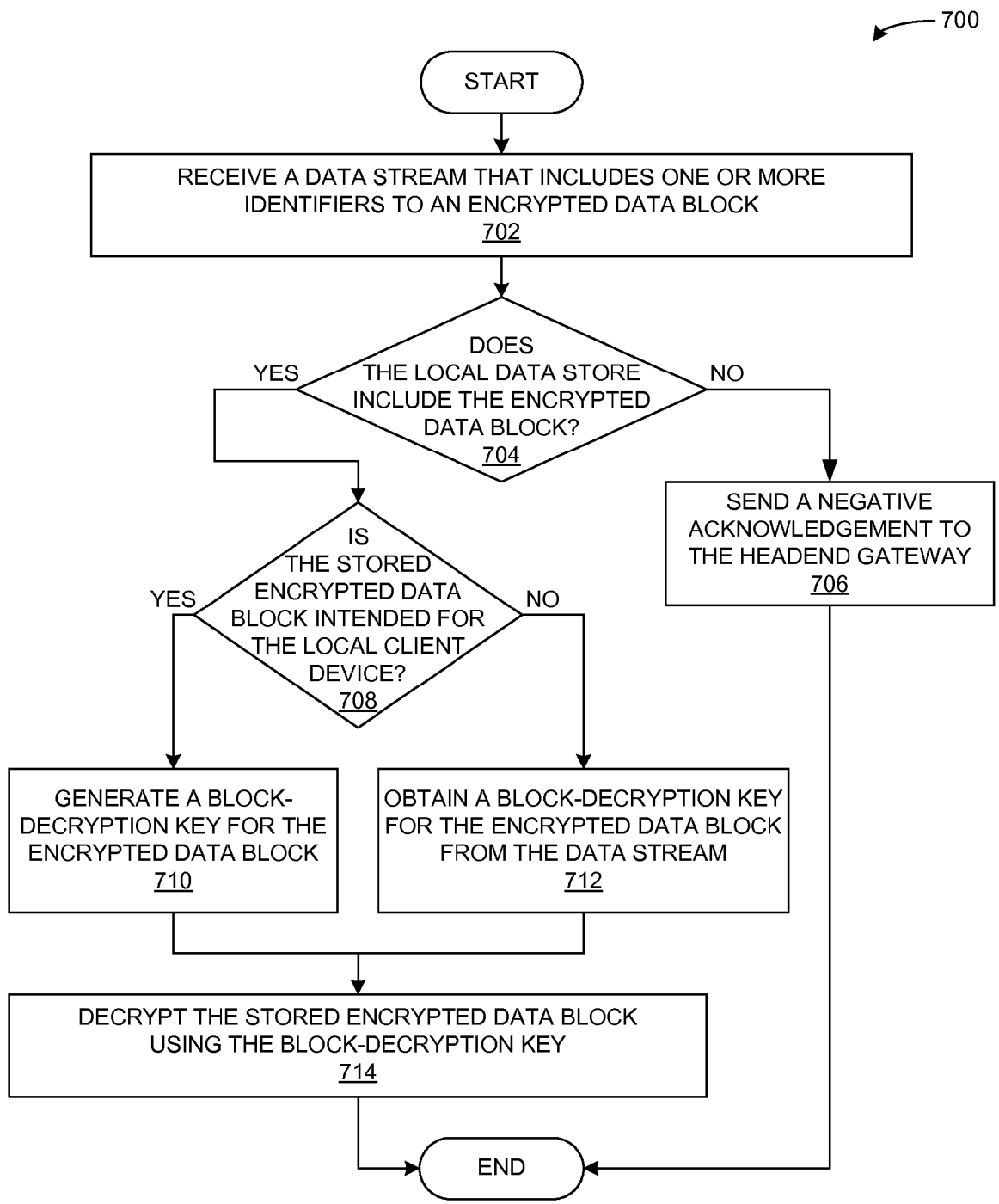
FIG. 7 presents a flow chart illustrating a method for processing a data stream at a client device in accordance with an embodiment.

FIG. 7 presents a flow chart illustrating a method 700 for processing a data stream at a client device in accordance with an embodiment. During operation, the system receives a data stream that includes one or more identifiers to an encrypted data block (operation 702), and determines whether the local data store includes the encrypted data block (operation 704). If the local data store does not include the encrypted data block, the system sends a negative acknowledgement to the headend gateway (operation 706).

Otherwise, if the local data store includes the encrypted data block, the system determines whether the stored copy of the encrypted data block is intended for the local client device. For example, the local data store may include an identifier to an intended recipient (e.g., a client device of the broadcast network) along with the encrypted data block. To determine whether the encrypted data block is intended for the local client device, the system can compare the stored device identifier to a device identifier for the local client device.

If the stored encrypted data block is intended for the local client device, the system generates a block-decryption key for the encrypted data block (operation 710), and decrypts the encrypted data block using the block-decryption key (operation 714). Otherwise, if the encrypted data block is intended for a different client device, the system obtains a block-decryption key for the encrypted data block from the data stream (operation 712), and proceeds to decrypt the encrypted data block (operation 714).

Upstream Data Deduplication

Users oftentimes re-transmit data that they have recently downloaded from a remote computer. For example, a user may browse a web page or receive an email that includes an attachment, such as an image, a video, a document, or a spreadsheet. If the use wants to share this content with others, the user can create an email that includes these items as an attachment. Sharing this information, however, requires re-transmitting the attached information back through the satellite broadband network. In some embodiments, the user's client device can determine which pieces of data have been cached by the local client device, which in turn indicates that this data has also been cached by the headend gateway. The client device can deduplicate the information that is transmitted to the headend gateway in an outbound data stream by replacing cached data blocks with identifiers to these cached data blocks.

Deduplicating data blocks at the client device can also have a significant impact on peer-to-peer services (e.g., BitTorent), which oftentimes require the client device to act as a data source for information that it has recently downloaded. For example, as the client device receives data blocks for one or more download objects, the client device can act as a data source without having to re-transmit these data blocks. If a remote client device requests these cached data blocks from the local client device, the local client device can respond by sending a data stream that includes the identifiers to these cached data blocks. The headend gateway can use these data block identifiers to generate a data stream that includes the cached data blocks for the remote client device.

Figure 8:
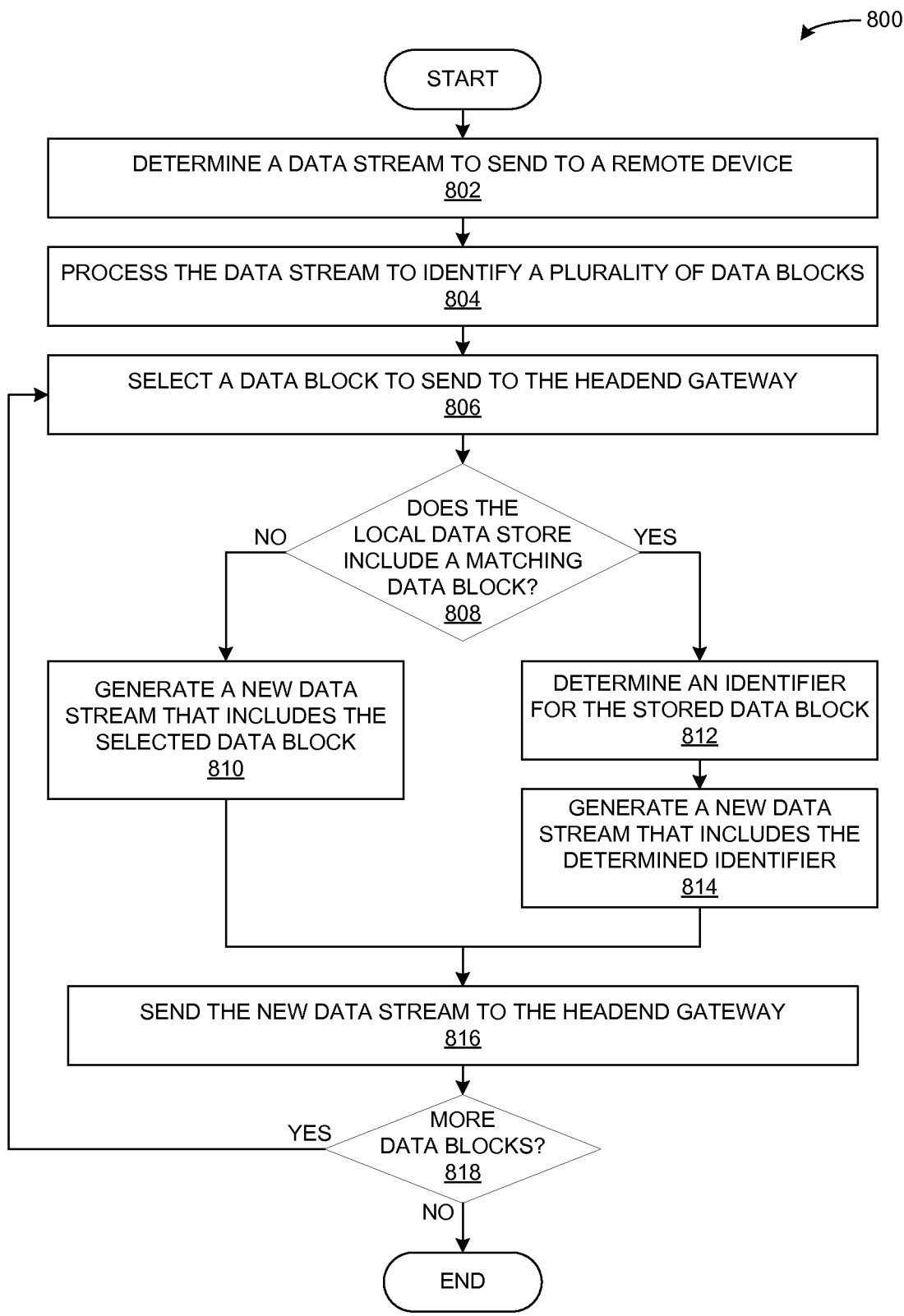
FIG. 8 presents a flow chart illustrating a method for generating a data stream at a client device to send to a headend gateway in accordance with an embodiment.

FIG. 8 presents a flow chart illustrating a method 800 for generating a data stream at a client device to send to a headend gateway in accordance with an embodiment. During operation, the system determines a data stream to send to a remote device (operation 802), and processes the data stream to identify a plurality of data blocks (operation 804). For example, to detect each data block of the data stream, the system can process the data stream using a rolling hash until it identifies a block boundary. Using the rolling hash allows the system to identify a block boundary based on the contents of a data stream, and not based on the source of the data stream. Once the system identifies the block boundary, the system can generate a data block to include a sequence of bits between a previous block boundary (or the start of the data stream) and the identified block boundary.

The system selects a data block to send to the headend gateway (operation 806), and determines whether the local data store includes a matching encrypted data block that the headend gateway has previously transmitted for the local client device (operation 808). If the system does not find a match, the system generates a new data stream that includes the selected data block (operation 810). Otherwise, if the system finds a matching data block in the data store, the system determines an identifier for the stored data block (operation 812), and generates a new data stream that includes the determined identifier in place of the data block (operation 814). The system then proceeds to send the new data stream to the headend gateway (operation 816).

The system then determines whether there are more data blocks to send to the headend gateway (operation 818). If so, the system returns to operation 806 to select another data block.

Figure 9:
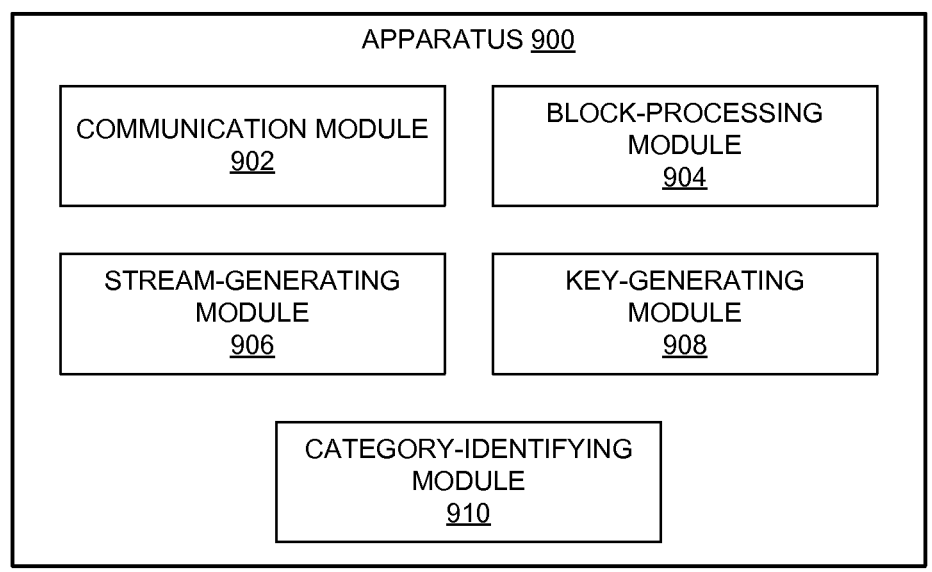
FIG. 9 illustrates an exemplary apparatus that facilitates communicating over a broadcast network in accordance with an embodiment.

FIG. 9 illustrates an exemplary apparatus 900 that facilitates communicating over a broadcast network in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication module 902, a block-processing module 904, a stream-generating module 906, a key-generating module 908, and a category-identifying module 910.

In some embodiments, communication module 902 can receive or transmit a data stream that includes a plurality of encrypted data blocks. Block-processing module 904 can partition an outbound data stream into a plurality of data blocks, and can determine identifiers to recently cached data blocks to deduplicate these data blocks. Stream-generating module 906 can generate a new data stream that includes these identifiers in place of the cached data blocks. Key-generating module 908 can generate a block-encryption key for encrypting a new data block, and can generate a block-decryption key for decrypting a cached data block. Category-identifying module 910 can determine a data category for a data object that is to be partitioned into a plurality of data blocks.

Figure 10:
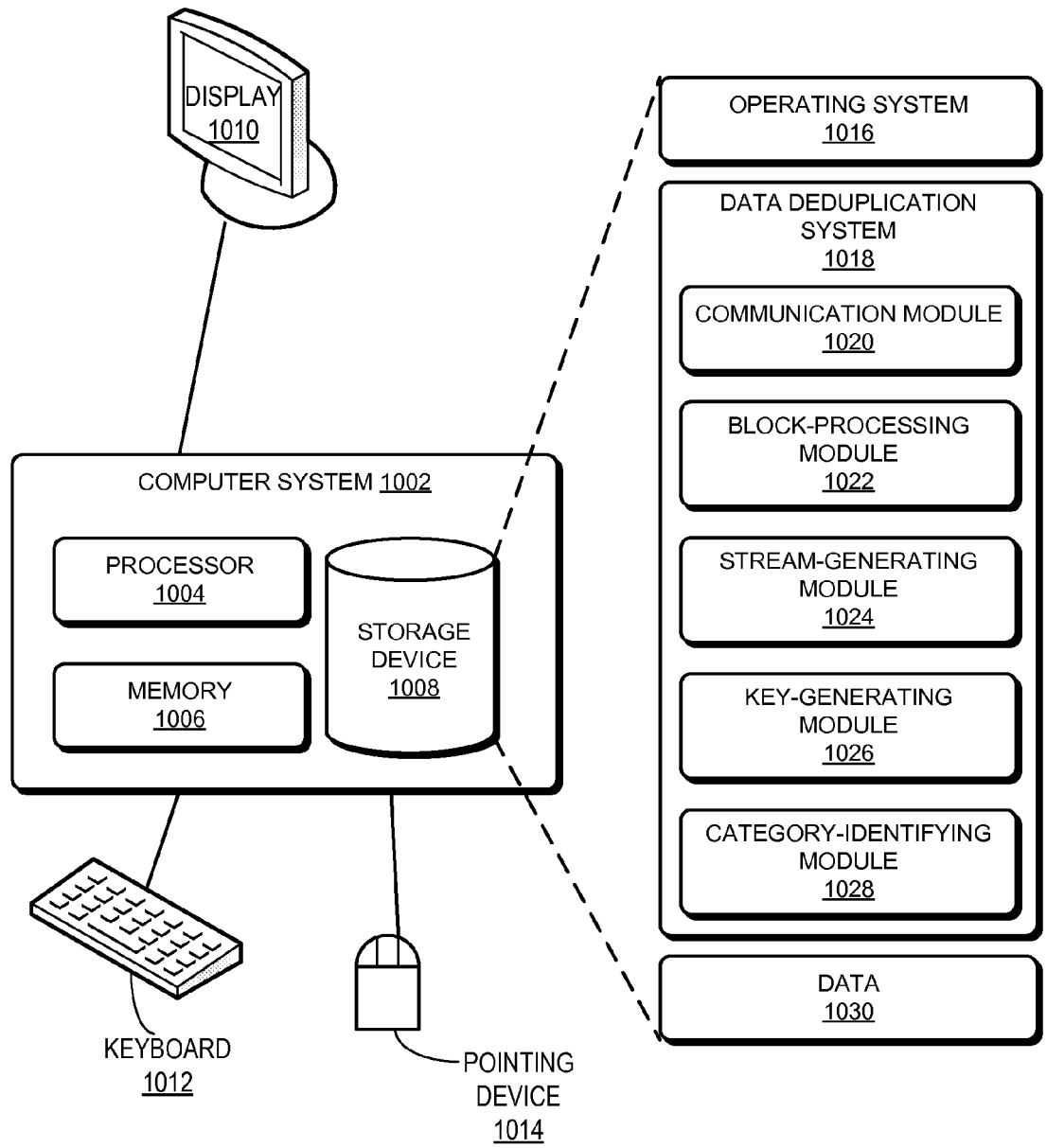
FIG. 10 illustrates an exemplary computer system that facilitates communicating over a broadcast network in accordance with an embodiment.

FIG. 10 illustrates an exemplary computer system 1002 that facilitates communicating over a broadcast network in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, a data deduplication system 1018, and data 1030.

Data deduplication system 1018 can include instructions, which when executed by computer system 1002, can cause computer system 1002 to perform methods and/or processes described in this disclosure. Specifically, data deduplication system 1018 may include instructions for receiving or transmitting a data stream that includes a plurality of encrypted data blocks (communication module 1020). Further, data deduplication system 1018 can include instructions for partitioning an outbound data stream into a plurality of data blocks, and determining identifiers to recently cached data blocks to deduplicate these data blocks (block-processing module 1022). Data deduplication system 1018 can also include instructions for generating a new data stream that includes these identifiers in place of the cached data blocks (stream-generating module 1024).

Data deduplication system 1018 can also include instructions for generating a block-encryption key for encrypting a new data block, and generating a block-decryption key for decrypting a cached data block (key-generating module 1026). Data deduplication system 1018 can also include instructions for determining a data category for a data object that is to be partitioned into a plurality of data blocks (category-identifying module 1028).

Data 1030 can include any data that is required as input or that is generated as output by the methods and/or processes described in this disclosure. Specifically, data 1030 can store at least a plurality of encrypted data blocks, data categories assigned to at least one client device (e.g., for computer system 1002 or a remote computing device), a plurality of data-encryption and/or data-decryption keys, and a plurality of data-block identifiers.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving, by a headend gateway, a first data stream to forward to a first client device of a plurality of client devices;
determining that a data block in the first data stream is not known to be stored by the first client device;
generating a block-encryption key for the data block based on a base key for the first client device;
generating an encrypted data block by encrypting the data block using the block-encryption key;
generating a second data stream for the first client device, wherein the second data stream includes the encrypted data block;
sending the second data stream to at least the first client device;
generating a block-decryption key for the encrypted data block, which involves deriving the block-decryption key from the base key for the first client device;
storing the encrypted data block along with the block-decryption key; and
responsive to determining that a second computing device needs to decrypt the encrypted data block, sending the block-decryption key to the second client device so that the block-decryption key is encrypted using a base key assigned to the second client device.

2. The method of claim 1, wherein determining whether the data block is known to be stored by the first client device involves:
 determining a previous transmission for the data block;
 computing a data-access identifier for the previous transmission of the data block; and
 comparing the data-access identifier to a range of identifiers associated with the first client device to determine whether a data block associated with the data-access identifier has been stored by the first client device.

3. The method of claim 2, wherein computing the identifier involves computing one or more of:
 a number of bytes necessary to store data blocks sent prior to the first data block;
 a number of data blocks that have been transmitted;
 a timestamp for the data block; and
 a storage location for the data block.

4. The method of claim 1, further comprising determining a data category for the first data stream, wherein the data category facilitates a client device in determining whether the client device needs to store the data block; and
 wherein the second data stream also includes the determined data category.

5. The method of claim 1, wherein the data block is an encrypted data block that has been encrypted for the second client device; and
 wherein the second data stream also includes a block-decryption key for the encrypted data block, wherein the block-decryption key is encrypted using a base encryption key assigned to the first client device.

6. The method of claim 1, further comprising:
 responsive to determining that the data block is not known to be stored by the first client device:
  generating a random cryptographic key for the data block;
  generating the encrypted data block by encrypting the data block using the random cryptographic key; and
  generating the second data stream so that the second data stream includes the encrypted data block and includes the random cryptographic key so that it is encrypted using a base key for the first client device.

7. The method of claim 6, further comprising:
 storing the encrypted data block along with the random cryptographic key; and
 responsive to determining that a second computing device needs to decrypt the encrypted data block, sending the random cryptographic key to the second client device so that the random cryptographic key is encrypted using a base key assigned to the second client device, thereby allowing the second client device to decrypt the encrypted data block of the second data stream without revealing to the second client device other data blocks of the second data stream.

8. The method of claim 1, further comprising:
 responsive to determining that the first data stream includes a second data block that has been sent to at least a third client device of the plurality of client devices and is known to be stored by at least the first client device, generating the second data stream to include an identifier to the second data block in place of the second data block.

9. The method of claim 8, further comprising:
 receiving, from the first client device, a negative-acknowledgement response which indicates that the first client device has not stored the second data block; and
 responsive to receiving the negative-acknowledgement response:
  generating a third data stream that includes the second data block; and
  sending the third data stream to at least the first client device.

10. The method of claim 8, further comprising:
 receiving, from the first client device, a negative-acknowledgement response which indicates that the first client device has not stored the second data block; and
 responsive to receiving the negative-acknowledgement response:
  generating a block-encryption key for the second data block based on a base key for the first client device;
  generating a second encrypted data block by encrypting the second data block using the block-encryption key;
  generating a third data stream that includes the second encrypted data block; and
  sending the third data stream to at least the first client device.

11. A non-transitory computer-readable storage medium storing instructions that when executed by a computer cause the computer to perform a method, the method comprising:
 receiving a first data stream to forward to a first client device of a plurality of client devices;
 determining that a data block in the first data stream is not known to be stored by the first client device;
 generating a block-encryption key for the data block based on a base key for the first client device;
 generating an encrypted data block by encrypting the data block using the block-encryption key;
 generating a second data stream for the first client device, wherein the second data stream includes the encrypted data block;
 sending the second data stream to at least the first client device;
 generating a block-decryption key for the encrypted data block, which involves deriving the block-decryption key from the base key for the first client device;
 storing the encrypted data block along with the block-decryption key; and
 responsive to determining that a second computing device needs to decrypt the encrypted data block, sending the block-decryption key to the second client device so that the block-decryption key is encrypted using a base key assigned to the second client device.

12. A computer-implemented method, comprising:
 receiving, by a local computing device, a plurality of data blocks from a broadcast network;
 storing, from the plurality of data blocks, a first data block that is intended for a remote computing device;
 receiving a first data stream that includes a first identifier to the first data block in place of the first data block;
 responsive to determining that a stored encrypted data block is not intended for the local computing device, obtaining from the first data stream a block-decryption key that is specific to the first data block, wherein the block-decryption key is derived from a base key for a computing device other than the local computing device, and wherein the block-decryption key is encrypted using a base key assigned to the local computing device;
 decrypting the encrypted block-decryption key for the first data block using the base decryption key; and
 accessing the first data block from storage using the first identifier, wherein accessing the first data block involves decrypting the first data block using the block-decryption key.

13. The method of claim 12, wherein storing the first data block involves:
   computing an implicit identifier for the first data block based on one or more of:
      a number of data blocks that have been received prior to the first data block;
      a number of bytes necessary to store data blocks received prior to the first data block;
      an amount of time that has passed prior to receiving the first data block; and
      a storage location for the first data block; and
   storing the first data block using the implicit identifier.

14. The method of claim 12, wherein storing the first data block involves:
   obtaining an explicit identifier for the first data block from the broadcast network; and
   storing the first data block using the explicit identifier.

15. The method of claim 12, wherein the block-decryption key is encrypted using a base key assigned to the local computing device; and
   wherein the method further comprises decrypting the encrypted block-decryption key for the first encrypted data block using the base decryption key.

16. The method of claim 12, further comprising:
   storing, from the plurality of data blocks, a second data block that is encrypted for the local computing device;
   receiving a second data stream for the local computing device, wherein the second data stream includes a second identifier to the second data block;
   generating a block-decryption key for the second data block using a one-way function that takes as input a base key assigned to the local computing device; and
   decrypting the second data block using the block-decryption key to obtain the data block.

17. The method of claim 12, further comprising:
   storing, from the plurality of data blocks, a second data block that is encrypted for the local computing device;
   receiving a second data stream for the local computing device, wherein the second data stream includes a second identifier to the second data block, and includes a random cryptographic key that is specific to the second data block; and
   decrypting the second data block using the cryptographic key to obtain the data block.

18. The method of claim 12, wherein storing the first data block involves:
   determining a data category for the first data block;
   comparing the determined data category to one or more target categories for the first client device; and
   responsive to determining that the data category matches a target category for the first client device, storing the first data block.

19. The method of claim 12, wherein the first identifier indicates at least one of:
   a number of bytes necessary to store data blocks received prior to the first data block;
   a number of data blocks that have been received prior to the first data block;
   an amount of time that has passed prior to receiving the first data block; and
   a storage location for the first data block.

20. The method of claim 12, further comprising:
   generating a second data block to send to a headend gateway;
   determining that the second data block matches a prior data block that has been received from the headend gateway;
   determining a second identifier for the prior data block; and
   generating a second data stream that includes the second identifier in place of the second data block and as a reference to the second data block; and
   sending the second data stream to the headend gateway.

21. The method of claim 12, further comprising:
   maintaining an in-memory index for stored data blocks that have been received via the broadcast network and decrypted; and
   responsive to generating a second data block to send to a headend gateway, using the in-memory index to:
      determine that the second data block matches a prior data block; and
      determining a second identifier for the prior data block;
   generating a second data stream that includes the second identifier in place of the second data block and as a reference to the second data block; and
   sending the second data stream to the headend gateway.

22. A computing device, comprising:
   one or more processors;
   a memory;
   a communication module to receive a plurality of data blocks from a broadcast network; and
   a block-processing module to store a first data block from the plurality of data blocks, wherein the first data block is intended for a remote computing device;
   wherein the communication module is further configured to receive a first data stream that includes a first identifier to the first data block in place of the first data block;
   wherein the communication module is further configured to, responsive to determining that a stored encrypted data block is not intended for the local computing device, obtaining from the first data stream a block-decryption key that is specific to the first data block, wherein the block-decryption key is derived from a base key for a computing device other than the local computing device, and wherein the block-decryption key is encrypted using a base key assigned to the local computing device;
   wherein the communication module is further configured to decrypt the encrypted block-decryption key for the first data block using the base decryption key; and
   wherein the block-processing module is further configured to access the first data block from storage using the first identifier, wherein accessing the first data block involves decrypting the first data block using the block-decryption key.

* * * * *